Nov. 25, 1930.  W. D. BAYLEY  1,782,675
SILO
Filed May 28, 1928
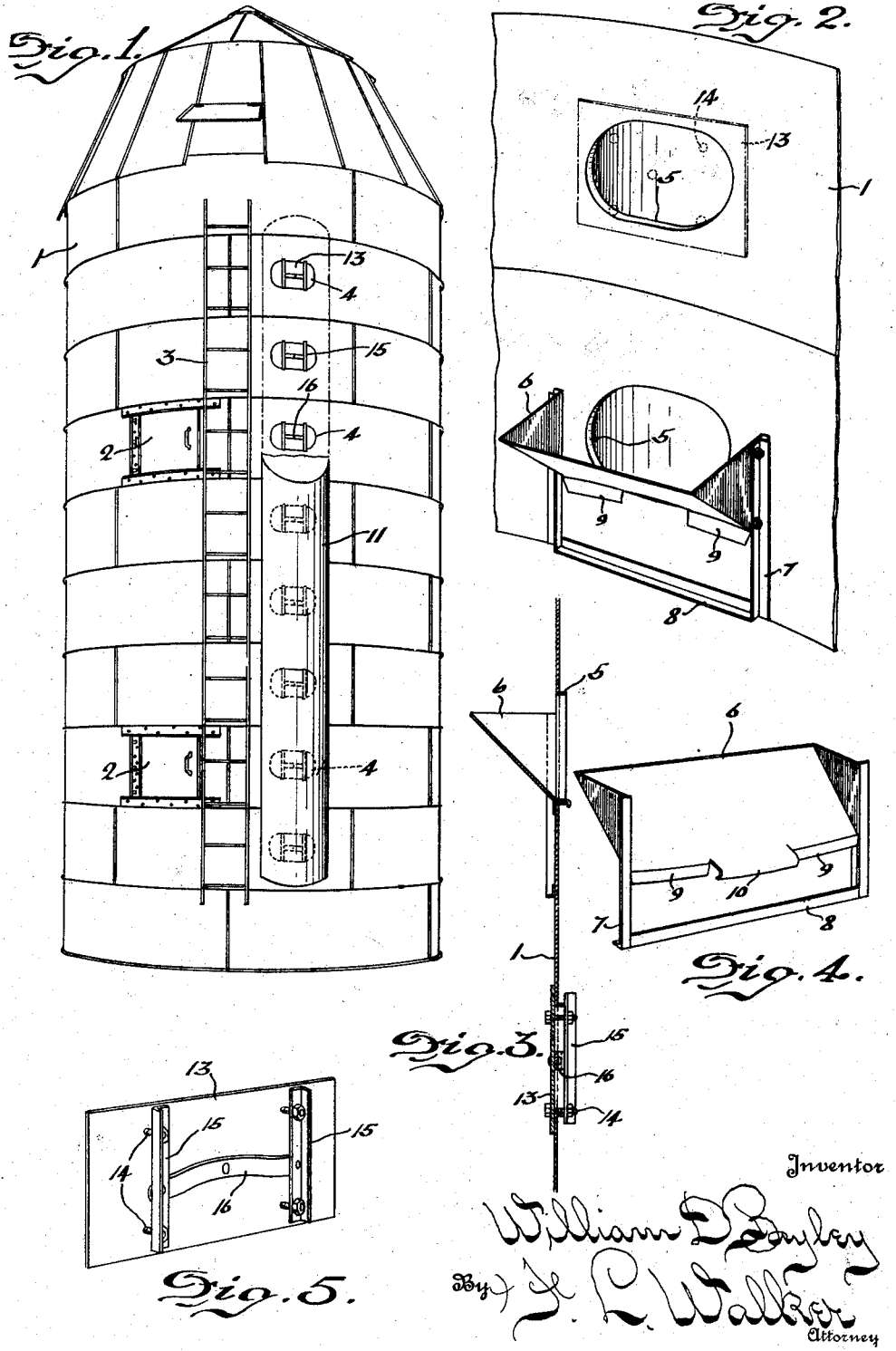

Patented Nov. 25, 1930

1,782,675

UNITED STATES PATENT OFFICE

WILLIAM D. BAYLEY, OF SPRINGFIELD, OHIO

SILO

Application filed May 28, 1928. Serial No. 281,040.

My invention relates to silos, and more particularly, to the position and arrangement of a series of discharge openings for ensilage additional to the usual access openings. It is customary in silo structures to provide a vertical series of access openings which are sufficiently large to admit a man to the interior of the silo and which are spaced as closely together as is practicable, in order that the ensilage need not be lifted to a great height in order to discharge it through such access openings. The provision of such large access openings at intervals not only weakens the silo structure, but it also very greatly increases the cost of manufacture and necessitates the provision of special reinforcements and the incorporation of a door panel. Furthermore the use of the access openings for the discharge of ensilage also necessitates a down chute for the discharge of ensilage of very much larger proportions, since the operator must climb through the interior of such chute to the access opening above the level of the ensilage.

In the present construction such access openings are few in number and are located at more widely spaced intervals while in addition thereto there is provided an entirely independent vertical series of smaller openings arranged at closer intervals through which the ensilage may be discharged. These discharge openings communicate with a down chute of much smaller dimensions than ordinary. Upon the interior of the silo structure there is provided a hopper which is engageable with the silo wall coincident with any one of the series of discharge openings.

Such construction not only minimizes the cost of production, but it also results in a very much stronger construction, enabling the silo walls to withstand greater bursting strain, and by permitting discharge openings to be located at less intervals it very materially reduces the height which the ensilage must be lifted in order to reach an accessible opening.

The object of the invention is to simplify the structure and arrangement of silos whereby they will not only be cheapened in construction, but will be afforded materially increased strength to resist bursting strain and so arranged as to facilitate the discharge of ensilage with minimum labor.

A further object of the invention is to facilitate the discharge of ensilage through an outlet opening of small size by providing a detachable hopper which may be engaged with different openings of a series.

A further object of the invention is to provide a silo arrangement which will enable the use of a down chute of small proportions and which may be easily erected at minimum cost.

With the above primary and other incidental objects in view as will more fully appear in the specification, the invention consists of the features of construction, the parts and combinations thereof, and the mode of operation as hereinafter described and set forth in the claims.

Referring to the accompanying drawings, wherein is shown the preferred, but obviously not necessarily the only form of embodiment of the invention, Fig. 1 is a side elevation of a silo structure embodying the present invention. Fig. 2 is an interior perspective view of a portion of the silo wall with its ensilage discharge openings and the detachable hopper. Fig. 3 is a vertical sectional view showing the relation of the discharge openings and the detachable hopper. Fig. 4 is a perspective view of the hopper detached from the side of the silo. Fig. 5 is a perspective view of one of the closure plates and fastening means for the discharge openings.

Like parts are indicated by similar characters of reference throughout the several views.

Referring to the drawings, 1 is the silo which for illustrative purposes has been shown constructed from sheet metal, although it is to be understood that the present invention is applicable to silos of other material. In the present construction, only two access doors 2—2 have been shown. It will be understood that the number of doors will depend entirely upon the height of the silo structure. These access openings are provided with closure doors of any suitable style or construction. By reducing the number of access openings 2, the walls of the silo may be circumferentially continuous throughout greater distances, thus materially increasing the strength of the silo walls and enabling them to resist greater bursting strain. Also the reduction in the number of access openings or doors 2 materially decreases the cost of construction. The silo is entered through these access openings 2 which are reached by the usual ladder 3.

Located at any convenient position in the walls of the silo is a vertical series of ensilage discharge openings 4. These openings are of comparatively small size, being only sufficiently large to permit the exit of a forkful of ensilage therethrough. These discharge openings 4 are preferably oval in shape and the material about the margins of such openings is flanged outwardly as at 5 to reinforce the walls at such points. By locating such discharge openings 3 at comparatively close intervals, at no time must the ensilage be lifted more than a very short distance from the level of the ensilage within the silo to the lowest accessible opening 4. Each of these openings are comparatively small and more or less difficulty might be found in directing every forkful of ensilage through the opening, especially when forking ensilage from the opposite side of the silo. A hopper 6 is provided into which the ensilage is thrown, and by which it is guided toward and through the discharge opening 4. This hopper 6 is formed from sheet metal and consists of an inclined bottom and triangular ends braced by an angle bar frame including legs 7 which rest against the inner side of the silo wall interconnected by a transverse bar 8 at their lower ends. The lower forward edge of the hopper is formed into two dependent flanges or lips 9 which bear against the inner face of the silo wall, while intermediate such lips or flanges 9 is an outwardly extending hook 10 which extends through the opening 4 and engages the outer side of the silo wall or the flange about such opening. This gives to the hopper a sort of cantilever form in which the hopper is anchored to the side of the wall by the engagement of the hooked or offset flange 10 over the bottom of the discharge opening 4 while the legs 7 and dependent flanges 9 bear against the inner face of the wall to support the hopper in its engaged position. The hopper is readily disengageable for reengagement with another discharge opening of the series.

Exteriorly of the silo there is provided a down spout 11 which in this case is of sheet metal bent to a semi-circular or channel shape. Angle bars 12 attached at intervals to the sides of such channel shaped down spout serve to connect the chute with the seams of the main structure 1. Since the chute 11 is for the descent of ensilage only it is of comparatively small size.

The discharge openings 4 are provided with closure plates 13 located interiorly of the silo wall about such opening. Attached to such plates in spaced relation by clamp bolts 14 are two angle bars 15 which engage the outer side of the silo wall when the closure is in its adjusted position. These clamp bars 15 are medially engaged by a transverse spring bar 16 connected medially to the closure plate 13 and at its ends to the respective clamp bars 15. This spring bar tends to hold the bar 15 away from the closure plate 13 to facilitate their engagement with the side of the silo wall. When in position the clamp bolts 14 at the lower ends of the clamp bars 15 rest upon the lower margins of the discharge openings 4 while the bolts 14 at the upper end of such bars 15 are spaced downwardly from the margins of the openings 4 sufficiently to permit an upward shifting movement of the closure plate and clamp bars when engaging and disengaging the closure with the side of the silo wall. At such time it will be understood that the operator is within the silo. In applying the closure, the clamp bolts 14 being released, the upper ends of the clamp bars are thrust outward through the opening 4 and the closure is raised upwardly sufficient to permit the lower ends of the bars to clear the lower margin of the opening. The lower ends of the bars being thrust out beyond the out-turned flanges of the opening 4 the closure is then lowered until the lowermost clamp bolt 14 rests upon the margin of the opening, at which time the lower ends of the bars 15 will overlap the silo wall below the opening while the upper ends will also remain in overlapping position above such opening. The bolts 14 are then tightened from the inner side of the closure. The nuts on the bolts are held by the flanges of the angle bars 15 from turning, while the bolt is being rotated by a screw driver or wrench, by the operator within the silo.

As the level of the ensilage within the silo is lowered sufficiently to expose one of the closure plates 13 of an opening 4, such closure is removed and the closure of the next opening 4 thereabove is placed in position. These discharge openings being closely spaced there is no time when the ensilage must be lifted any great distance. It will be understood that as the ensilage is lowered in the silo the operator entering the silo reaches such level by means of a conveniently placed ladder leading from the ensilage level to the access opening 2 thereabove.

The construction herein described not only permits the down chute to be made a much smaller size, but it also permits it to be extended close to the ground and thus eliminates the necessity for the usual feed room.

The ordinary silo chute must be of much larger size to enable a man to climb through the chute to reach the ensilage level, and ordinarily this man size chute must start from the roof of a building or a room at the base of the silo which usually connects the silo and the barn and is known as the feed room. If desired, the feed room feature may be employed in conjunction with the present silo.

The projecting continuous flanges about the discharge openings afford the necessary strength and rigidity without the necessity of riveting or bolting a reinforcement frame about these openings. Moreover the shape of these discharge openings with rounded ends and the elimination of corners does not weaken the wall structure to the same extent as if these openings were rectangular. It is to be understood, however, that the invention is not limited to such oval or rounded openings but may include discharge openings of rectangular or other polygonal shape.

While for illustrative purposes, an all-steel or sheet metal silo has been illustrated and described, it is to be understood that the dominant features of the invention may be applied equally as well to silos of wood, concrete, tile or brick. Likewise the present invention may be embodied in a silo constructed of a combination of these materials, or any of them and sheet metal. For example, a sheet metal panel or strip with the discharge openings in it and with a down chute attached may be incorporated in a silo wall otherwise constructed of concrete, wood or other non-metallic material. Such door and chute unit embodying the features of the present invention might be manufactured for sale to farmers who construct their own silos from such materials as may be conveniently at hand.

From the above description it will be apparent that there is thus provided a construction of the character described, possessing the particular features of advantage before enumerated as desirable, but which obviously is susceptible of modification in its form, proportion and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A silo structure having an access door, and having an ensilage discharge opening independent of said door, a hopper located interiorly of the silo coincident with said discharge opening and directing ensilage therethrough and a chute exteriorly of the silo with which said discharge opening communicates, said chute being removed from said access door.

2. A silo having a plurality of entrance openings, and a separate series of ensilage discharge openings, a chute with which the discharge openings communicate, removable closures for said openings, and a hopper detachably engageable interiorly of the silo in proximate relation with different ensilage discharge openings of the series.

3. A silo structure having a vertical series of spaced access openings, and a separate vertical series of more closely spaced ensilage discharge openings, a down chute common to the openings of the last series and independent of the series of access openings, and removable closures for said discharge openings.

4. A silo structure having a plurality of openings for the discharge of ensilage, and a hopper detachably engageable with the interior wall of the silo coincident with different openings of the series.

5. A silo structure formed from sheet metal having therein a vertical series of spaced ensilage discharge openings, the material about said openings being outwardly flanged, and a series of closure plates for such openings.

6. A silo structure formed from sheet metal having therein a vertical series of spaced oval ensilage discharge openings, the openings being of less diameter in either direction than the wall sheet in which such opening is located whereby a continuous unbroken area of wall sheet is afforded around each opening, the material about said openings being outwardly flanged and a series of closure plates therefor.

7. A silo having therein a plurality of vertically spaced access doors and a second vertical series of ensilage discharge openings, said openings being of substantially oval shape and laterally disposed standing flanges about said openings.

8. A silo wall portion having access doors located at different levels, and having a vertical series of ensilage discharge openings adjacent to the door openings, and a ladder attached to the wall portion intermediate the access doors and ensilage discharge openings.

9. A silo wall portion of sheet metal having therein a vertical series of spaced ensilage discharge openings, said openings being rounded at their ends and marginal projecting flanges integral with the sheet metal wall portion surrounding the said discharge openings.

10. A silo structure having entrance openings at different levels, and having a series of vertically spaced ensilage discharge openings independent of the entrance openings, closures for said discharge openings and means operable from the interior of the silo for securing and releasing said closures.

11. A silo structure having entrance openings at different levels, and having a series of vertically spaced ensilage discharge openings independent of the entrance openings, closures for said discharge openings overlapping the margins of the openings at one side of the silo wall, clamp bars carried by the closures in spaced relation therewith and insertable through the openings into overlapping relation with the margins of the opening at the opposite side of the silo wall, and clamp bolts connecting the bars and closures for clamping the margins of the openings therebetween.

12. A silo structure having a series of vertically spaced ensilage discharge openings, closures therefor each including a plate, a pair of angle bars disposed in parallel relation transversely of the plate at one side thereof, clamp bolts connecting the angle bars in spaced relation with the plate, and a spring bar medially connected to the plate, the ends of which engage the angle bars for yieldingly holding the bars away from the plate, said closures being engaged by clamping the margin of the opening between the angle bars and plate.

13. A silo construction including a vertical series of discharge openings for discharge of ensilage, closure plates therefor overlapping the margins of the openings at the inner side of the silo wall and means operable from the interior of the silo for clamping said closure plates in their adjusted positions.

14. A silo construction having therein a vertical series of spaced ensilage discharge openings, and having a plurality of entrance openings independent of the ensilage discharge openings, and a down chute with which the ensilage discharge openings communicate independent of the entrance openings.

15. A silo construction having therein a vertical series of spaced ensilage discharge openings, and a hopper detachably engageable with the silo wall coincident with one or another of said openings, said hopper including a hook shaped portion extendible through one of said openings and engaging with the outer side of the silo wall, and a dependent rest portion abutting against the interior face of the silo wall below the opening.

16. A silo construction having therein a vertical series of spaced ensilage discharge openings, and a hopper engageable interiorly of the silo wall coincident with one or another of said openings, and means for temporarily supporting the hopper upon the silo wall independent of other supporting means.

17. A silo structure formed from sheet metal wall sheets and having a vertical series of spaced openings therein and continuous out-turned flanges formed from the wall sheet material and entirely surrounding the openings.

18. A silo structure formed from sheet metal wall sheets and having therein a series of vertically spaced openings of curvilinear outline, each opening being medially disposed within a wall sheet whereby a continuous unbroken area of wall sheet is provided about each opening.

In testimony whereof, I have hereunto set my hand this 8th day of May, A. D. 1928.

WILLIAM D. BAYLEY.